US012719739B2

(12) United States Patent
Santos Morla et al.

(10) Patent No.: US 12,719,739 B2
(45) Date of Patent: Aug. 25, 2026

(54) MAINTAINING ROOT CAUSE ANALYSIS VISIBILITY VIA PSEUDO-MEASUREMENTS

(71) Applicant: Cisco Technology, Inc., San Jose, CA (US)

(72) Inventors: Ricardo Santos Morla, Vila Nova de Gaia (PT); Kyle Graham Schomp, Avon, OH (US); Arash Molavi Kakhki, San Francisco, CA (US); Julien Armand Pierre Gamba, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 18/811,094

(22) Filed: Aug. 21, 2024

(65) Prior Publication Data

US 2026/0095364 A1 Apr. 2, 2026

(51) Int. Cl.

| | |
|---|---|
| ***H04L 41/0631*** | (2022.01) |
| ***H04L 43/04*** | (2022.01) |
| ***H04L 43/091*** | (2022.01) |
| ***H04L 43/16*** | (2022.01) |

(52) U.S. Cl.

CPC .......... *H04L 41/0631* (2013.01); *H04L 43/04* (2013.01); *H04L 43/091* (2022.05); *H04L 43/16* (2013.01)

(58) Field of Classification Search

CPC ... H04L 41/0631; H04L 43/04; H04L 43/091; H04L 43/19; H04L 43/10

See application file for complete search history.

(56) References Cited

U.S. PATENT DOCUMENTS

| | | | |
|---|---|---|---|
| 2002/0198985 A1 | 12/2002 | Fraenkel et al. | |
| 2018/0034685 A1 | 2/2018 | Naous | |
| 2018/0302189 A1* | 10/2018 | Harrod, IV | H04L 43/16 |
| 2024/0097970 A1 | 3/2024 | Harsh et al. | |
| 2024/0187302 A1* | 6/2024 | Safavi | H04L 41/064 |

(Continued)

FOREIGN PATENT DOCUMENTS

| | | |
|---|---|---|
| WO | 2023084282 A1 | 5/2023 |
| WO | 2023091664 A1 | 5/2023 |

OTHER PUBLICATIONS

Artley B., "Time Series Forecasting with ARIMA , SARIMA and SARIMAX", Towards Data Science, Medium, Apr. 26, 2022, Retrieved from https://towardsdatascience.com/time-series-forecasting-with-arima-sarima-and-sarimax-ee61099e78f6 on Jun. 3, 2024, pp. 1-36.

(Continued)

*Primary Examiner* — Tonia L Dollinger
*Assistant Examiner* — Mehulkumar J Shah
(74) *Attorney, Agent, or Firm* — Merchant & Gould P.C.; Kenneth J. Heywood

(57) ABSTRACT

In one implementation, a device may detect a drop in an amount of agents reporting network measurements for a network component; identify, based on network measurements from before and at a time of the drop, a network component set associated with the drop; generate, based on the network component set, a pseudo-measurement to represent absent data associated with the drop; and provide the pseudo-measurement as an input for root cause analysis.

20 Claims, 5 Drawing Sheets

(56) References Cited

U.S. PATENT DOCUMENTS

| | | | | |
|---|---|---|---|---|
| 2024/0291706 | A1 * | 8/2024 | Jea | H04L 41/122 |
| 2025/0165330 | A1 * | 5/2025 | Venkatachalam | G06F 11/079 |

OTHER PUBLICATIONS

Bonniot L., et al., "Towards Internet-Scale Convolutional Root-Cause Analysis with DiagNet", IPDPS 2021—The 35th IEEE International Parallel and Distributed Processing Symposium, HAL Open Science, Submitted on May 18, 2021, 11 Pages.

Caesar M., et al., "Towards Root Cause Analysis of Internet Routing Dynamics", Jan. 1970, 12 Pages.

Kreibich C., et al., "Netalyzr: Illuminating the Edge Network", IMC'10, Nov. 1-3, 2010, pp. 246-259.

Lin J., et al., "Automated Anomaly Detection and Root Cause Analysis in Virtualized Cloud Infrastructures", NOMS 2016—2016 IEEE/IFIP Network Operations and Management Symposium, Apr. 2016, 8 Pages.

Linkedin: "How do You Handle Incomplete Data in Root Cause Analysis?", Last Updated on Apr. 27, 2024, Retrieved from https://www.linkedin.com/advice/3/how-do-you-handle-incomplete-data-root-cause-analysis on Jun. 3, 2024, pp. 1-4.

Magalhaes J.P., et al., "Root-cause Analysis of Performance Anomalies in Web-based Applications", CISUC SSE 2011, Apr. 20, 2011, 29 Pages.

Sundaresan S., et al., "WTF? Locating Performance Problems in Home Networks", Georgia Institute of Technology, Jan. 2013, pp. 1-15.

Wikipedia: "Anomaly Detection", Retrieved from https://en.wikipedia.org/wiki/Anomaly_detection on Jun. 3, 2024, pp. 1-12.

Wikipedia: "Change Detection", Retrieved from https://en.wikipedia.org/wiki/Change_detection on Jun. 3, 2024, pp. 1-7.

Wikipedia: "Time Series", Retrieved from https://en.wikipedia.org/wiki/Time_series on Jun. 3, 2024, pp. 1-15.

Yan H., et al., "G-RCA: A Generic Root Cause Analysis Platform for Service Quality Management in Large IP Networks", IEEE/ACM Transactions on Networking, Dec. 2012, vol. 20, No. 6, pp. 1734-1747.

* cited by examiner

505 Start 510 detect a drop in an amount of agents reporting network measurements for a network component 515 identify, based on network measurements from before and at a time of the drop, a network component set associated with the drop 520 generate, based on the network component set, a pseudo-measurement to represent absent data associated with the drop 525 provide the pseudo-measurement as an input for root cause analysis 530 End

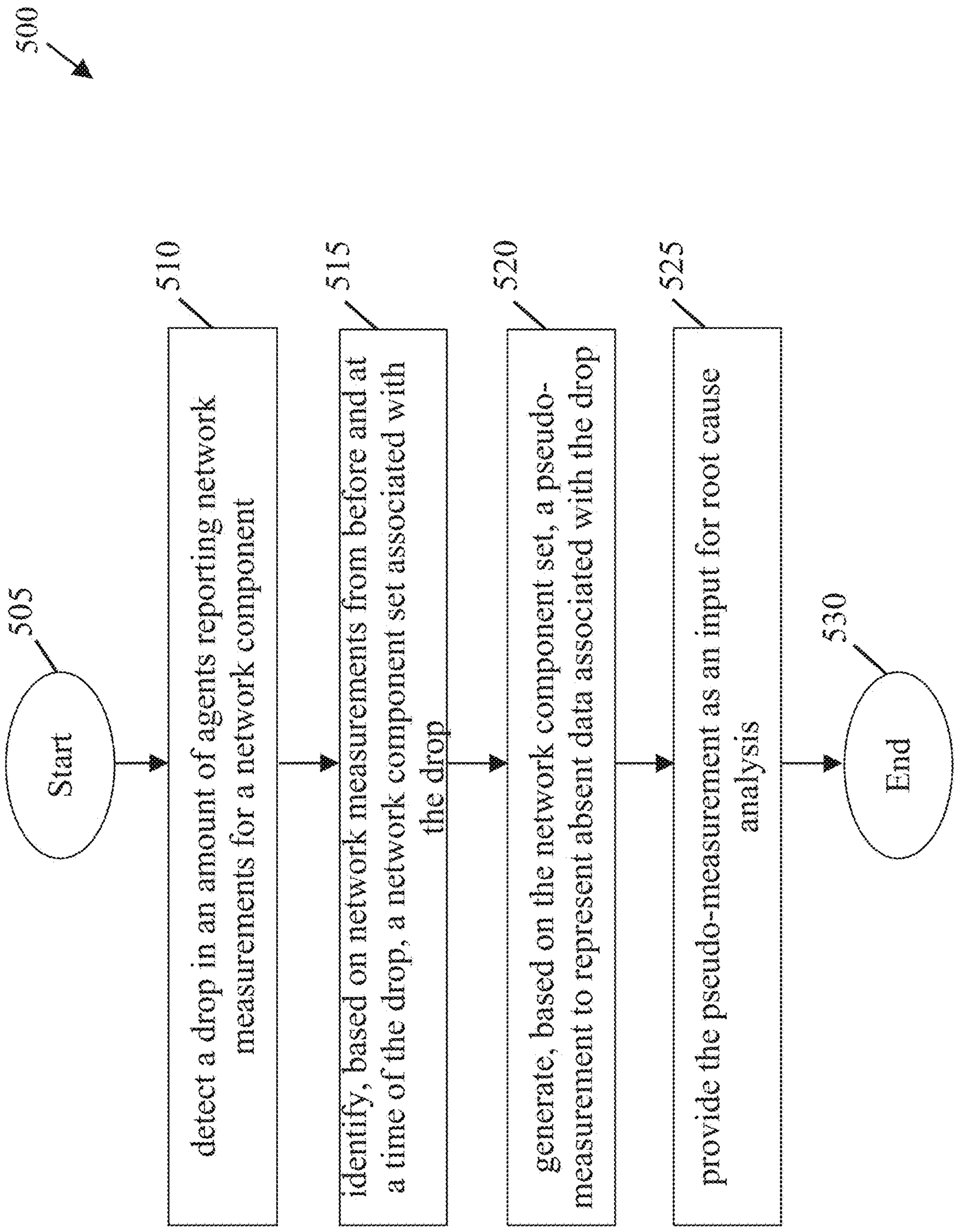

FIG. 5

MAINTAINING ROOT CAUSE ANALYSIS VISIBILITY VIA PSEUDO-MEASUREMENTS

TECHNICAL FIELD

The present disclosure relates generally to computer networks and more particularly to maintaining root cause analysis visibility via pseudo-measurements.

BACKGROUND

End-to-end Internet measurements play a central role in diagnosing and managing network performance issues. Indeed, these measurements are a prerequisite for any root cause analysis (RCA) to identify and localize any faults or other errors within the network. This allows RCA to identify the specific network components responsible for performance degradations in the network, thereby allowing a network administrator to promptly address and resolve such issues.

Currently, RCA techniques depend on the availability of continuous and accurate end-to-end measurements. Typically, these measurements are collected by agents distributed across the network and are expected to capture any errors or anomalies. However, existing RCA methods also do not account for scenarios where measurements are entirely absent due to a component failure.

The inability to detect and handle the absence of measurements present a lack of visibility for RCA techniques. For instance, when a component fails or stops reporting measurements, the RCA techniques lose partial or complete visibility into the errors, severely impeding their ability to identify the faulty component. This can result in undetected network issues and prolonged downtimes, as the RCA systems struggle to accurately diagnose and attribute faults within this blind spot.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 5 illustrates an example of a simplified procedure for maintaining root cause analysis visibility via pseudo-measurements, in accordance with one or more implementations described herein.

DESCRIPTION OF EXAMPLE IMPLEMENTATIONS

Overview

According to one or more implementations of the disclosure, a device may detect a drop in an amount of agents reporting network measurements for a network component; identify, based on network measurements from before and at a time of the drop, a network component set associated with the drop; generate, based on the network component set, a pseudo-measurement to represent absent data associated with the drop; and provide the pseudo-measurement as an input for root cause analysis.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
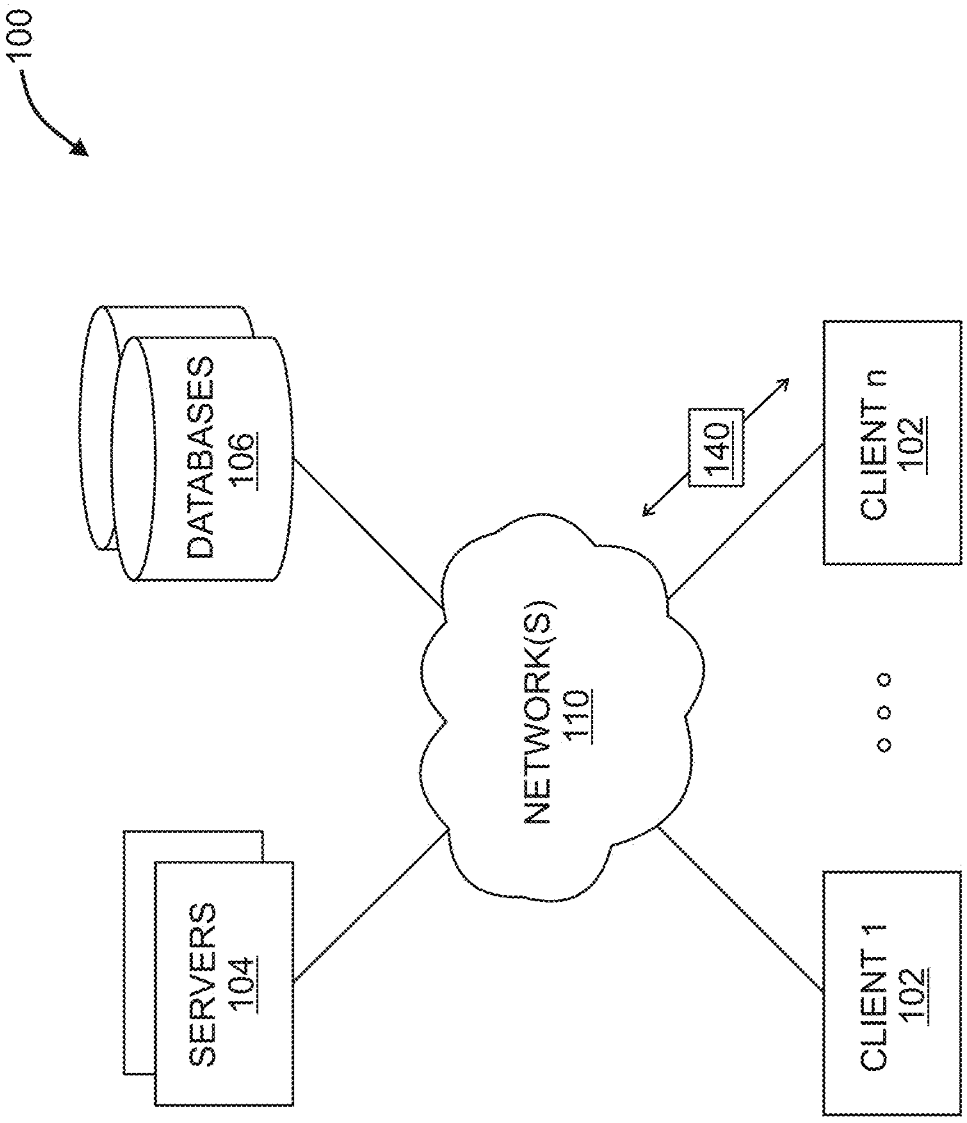
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device (s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
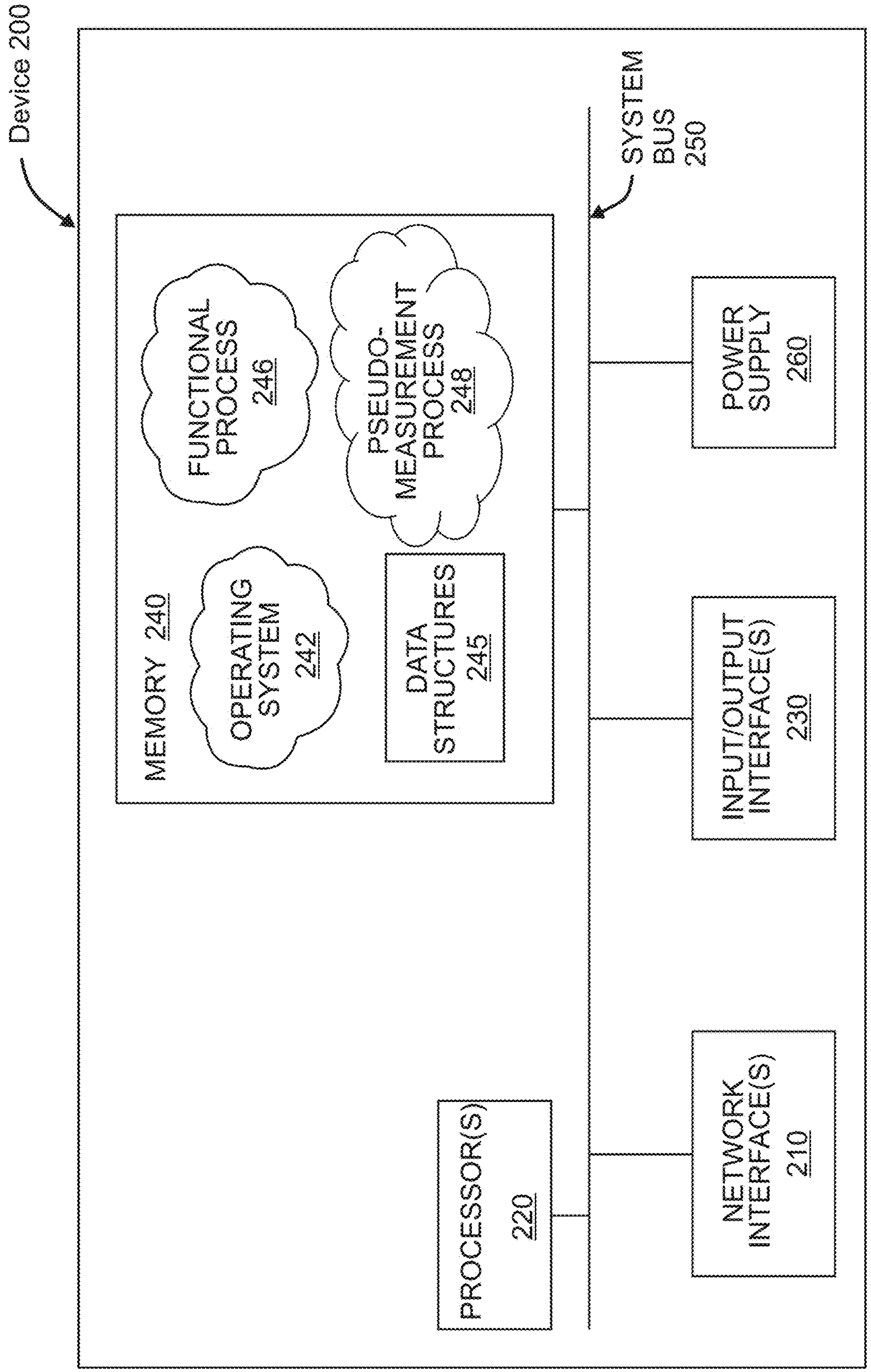
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as pseudo-measurement process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, pseudo-measurement process 248 may include computer executable instructions that, when executed by processor 220, cause device 200 to perform the techniques described herein. To do so, in some implementations, pseudo-measurement process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, pseudo-measurement process 248 may employ and/or be utilized to handle prompts to and/or access of one or more supervised, unsupervised, or semi-supervised machine learning models trained to perform usage drop detection, generate pseudo measurement generation, perform root cause analysis, etc.

Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that pseudo-measurement process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, pseudo-measurement process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, pseudo-measurement process 248 may be a component of, use, and/or be utilized in the management of prompts/access to a generative model to perform network mapping, generate configurations, analyses, root cause analysis, or other outputs based on a conversational input from a user (e.g., voice, text, etc.). In another example, pseudo-measurement process 248 may utilize a generative model with a method invocation data collector (MIDC) to assist in automated or manual identification of transactional attributes for spans. In yet another example, pseudo-measurement process 248 may be utilize a generative model to perform usage drop detection, generate pseudo measurement generation, perform root cause analysis, etc. Example generative approaches can include, but are not limited to, generative adversarial networks (GANs), foundation models such as large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
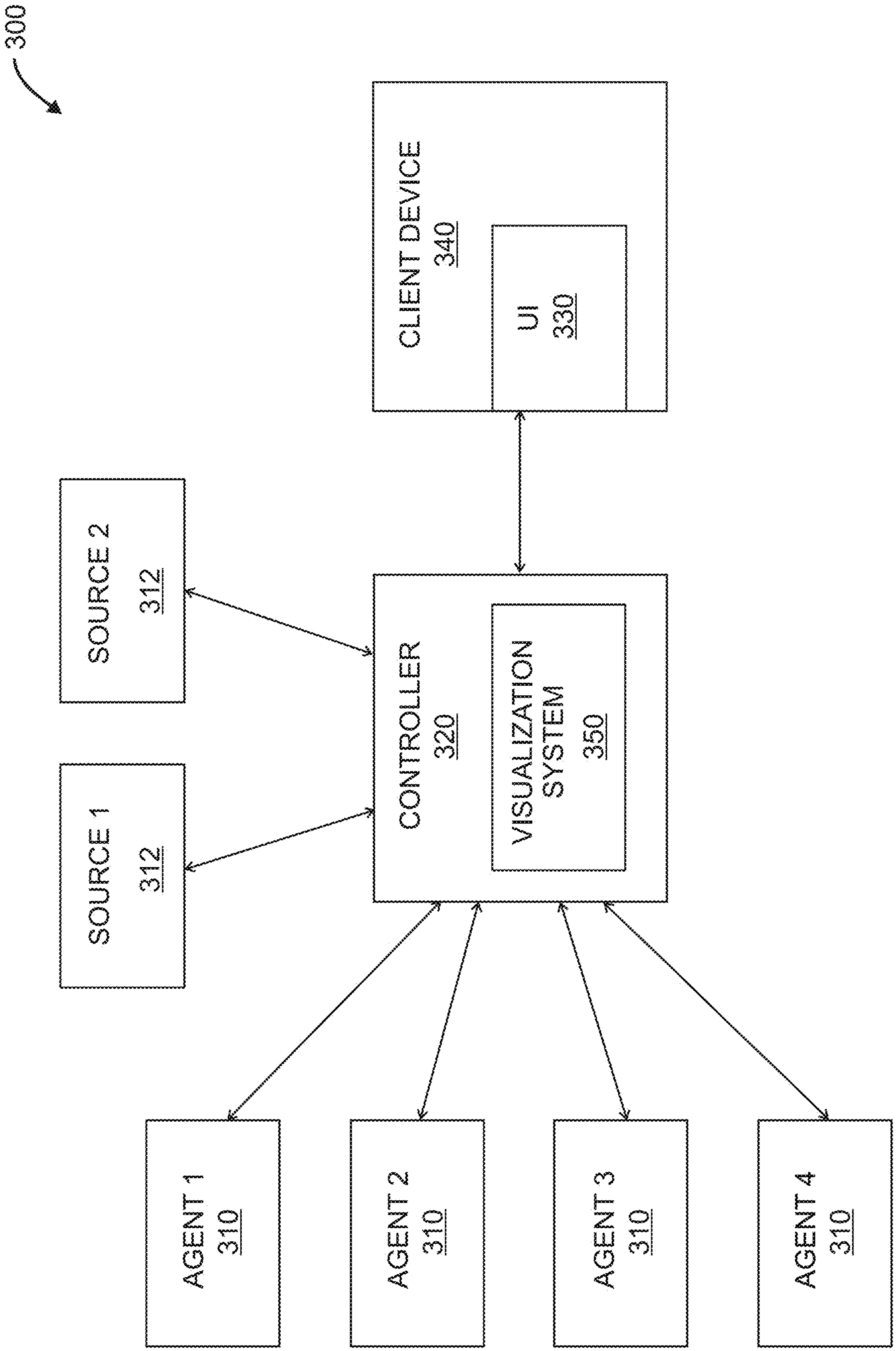
FIG. 3 illustrates an example observability intelligence platform.

FIG. 3 is a block diagram of an example of an observability intelligence platform 300 that can implement one or more aspects of the techniques herein. The observability intelligence platform 300 is a system that monitors and collects metrics of performance data for a network and/or application environment being monitored. At the simplest structure, the observability intelligence platform 300 includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform 300. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, end-to-end Internet measurements with errors may be caused by one or more faulty network components. Root cause analysis techniques (RCA) use these measurements with errors to determine which of the possible faulty network components is to blame for the errors. However, it is possible that a faulty component causes the absence of measurements rather than measurements with errors, because the fault prevents reporting of the measurements with errors. In this case, the root cause analysis technique loses partial or complete visibility into the errors and its ability to blame a faulty component is lost or impeded.

For instance, customer data has revealed instances where a VPN server fails and the agents start routing measurements directly to the target, bypassing the VPN and leaving the system without crucial measurements through the VPN. Consequently, the RCA techniques lose partial or complete visibility into the errors that may be associated with the VPN server and/or its measurement. Thus, the RCA technique does not have measurements with which to name the VPN as the cause of the problem. In general, the loss of this data severely degraded the ability to identify the faulty component through traditional RCA techniques. Without a mechanism to address this absence, RCA systems struggle to accurately diagnose and attribute faults, leading to ineffective network management and unresolved performance issues.

Maintaining Root Cause Analysis Visibility via Pseudo-measurements

In contrast, the techniques described herein introduce a mechanism implementable to overcome such an absence of measurements as outlined above, in a way that can be leveraged by root cause analysis techniques even when device failures have occurred that may otherwise prevent measurements from being collected at all.

Illustratively, the techniques described herein may be performed by hardware, software, and/or firmware, such as in accordance with pseudo-measurement process 248, which may include computer executable instructions executed by the processor 220 (or independent processor of interfaces 210) to perform functions relating to the techniques described herein.

Specifically, according to various implementations, a device may detect a drop in an amount of agents reporting network measurements for a network component; identify, based on network measurements from before and at a time of the drop, a network component set associated with the drop; generate, based on the network component set, a pseudo-measurement to represent absent data associated with the drop; and provide the pseudo-measurement as an input for root cause analysis.

Figure 4:
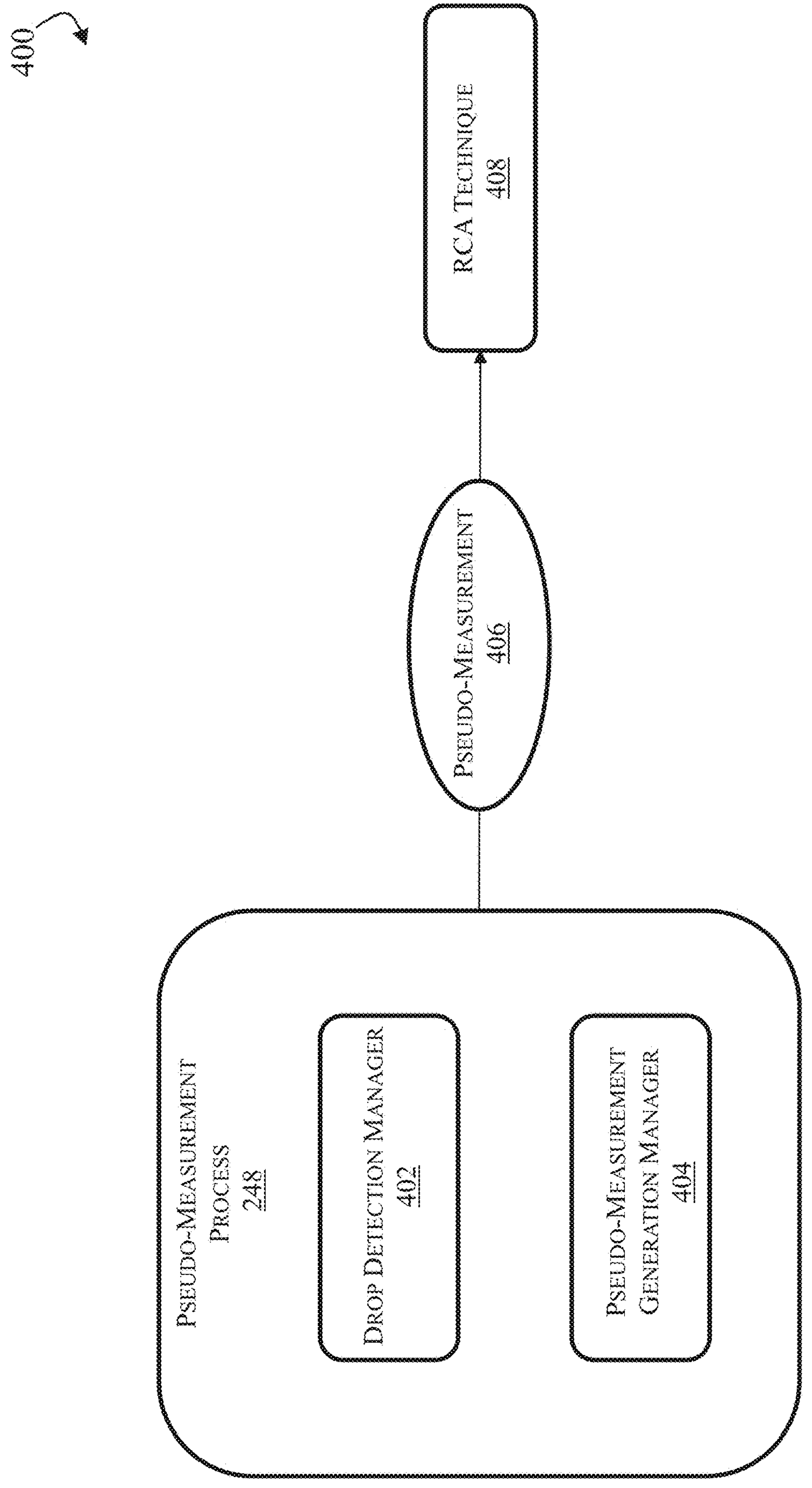
FIG. 4 illustrates an example of an architecture for maintaining root cause analysis visibility via pseudo-measurements.

Operationally, FIG. 4 illustrates an example of an architecture 400 for maintaining root cause analysis visibility via pseudo-measurements, in accordance with one or more implementations described herein. At the core of architecture 400 is pseudo-measurement process 248, which may be executed (wholly or partially) by a controller for a network or another device in communication therewith.

For instance, pseudo-measurement process 248 may be executed by a controller for a network, a particular networking device in the network (e.g., a router, a firewall, etc.), a server, another device or service in communication therewith, or the like. All or some of the pseudo-measurement process 248 may be executed as a component of and/or in coordination with an observability intelligence platform (e.g., observability intelligence platform 300). Furthermore, all or some of pseudo-measurement process 248 may be executed as a component of and/or in coordination with a machine learning model (e.g., generating inputs for, utilizing outputs of, etc.).

As shown, pseudo-measurement process 248 may include any or all of the following components: drop detection manager 402 and/or pseudo-measurement generation manager 404. As would be appreciated, the functionalities of these components may be combined or omitted, as desired. In addition, these components may be implemented on a singular device or in a distributed manner, in which case the combination of executing devices can be viewed as their own singular device for purposes of executing pseudo-measurement process 248.

Generally, pseudo-measurement process 248 may be executable to enhance the visibility and accuracy of root cause analysis (RCA) in network performance monitoring. The process may ensure that an RCA technique 408 can effectively identify and diagnose faults even when direct measurement data is missing due to network component failures. For example, the components of pseudo-measurement process 248 are operable to detect significant drops in measurement reporting from network agents and generate pseudo-measurements to represent the absent data. By integrating these pseudo-measurements into the RCA workflow, architecture 400 maintains the diagnostic capabilities of an RCA technique 408, allowing for accurate fault localization and improved network management despite missing data.

As used herein, end-to-end network measurements may include a set of values for metrics like loss, latency, HTTP response time, etc. to a target across the network/Internet. As used herein, an agent may include software capable of performing end-to-end network measurements. As used herein, a network component may refer an identifiable part of the network or IT system that can be assign to a measurement. Examples may include the agent that performs the measurement, the wireless gateway, VPN server, Internet AS or IP router, the HTTP server, etc. that the agent uses to send packets while performing the measurement. As used herein, a pseudo-measurement 406 may include an artificial measurement without any end-to-end metrics but that signals the absence of an actual end-to-end measurement. Pseudo-measurements may contain the network component set that can potentially be the cause for the absent measurement.

When executed, drop detection manager 402 may detect drops in the number of agents reporting measurements in any network component of interest. Drop detection manager 402 may detect a drop in the number of agents on a usage-drop network component utilizing an estimate of the minimum number of agents with measurements that use the usage-drop network component. As used herein, the usage-drop network component may include the network component for which a drop in agent count is being detected. An agent count may be the amount of agents performing measurements in a round. As a follow on, the agent count drop may be the difference between the amounts of agents between two rounds. Here, the round may be a time or event defined window over which measurements are aggregated (e.g., a parameter such as five minutes). As used herein, the minimum agent count may be the minimum amount of agent performing measurements in a round, for a set of rounds in prior data. This estimate may be obtained from past observations and can be network component specific.

Drop detection manager 402 may utilize one or more of various techniques to detect a drop between two rounds. For instance, if the usage-drop network component is used twenty-four hours a day and has a cap on how many agents can go offline—for example a VPN server that serves minimum five hundred endpoint devices twenty-four hours a day and never sees a change of more than one hundred agents—the drop detection manager 402 may estimate a fixed (e.g., a percentage such as twenty percent) relative agent count drop. As used herein, an agent going offline may include an agent that stops performing measurements because the user switched off their device (e.g., laptop) or other causes not related to a fault in the usage-drop network component. Further, as used herein, a relative agent count drop may include an agent count drop between two rounds, relative to the earlier round.

Alternatively, if the usage-drop component is heavily used twenty-four hours a day but it isn't known how many agents can suddenly go offline, prior data may be utilized to determine the minimum agent count and/or the maximum relative agent count drop. As used herein, the maximum relative agent count drop may include the maximum value of the relative agent count drop, for a set of rounds in prior data. In this case, the estimate for the minimum number of agents may be the largest of the following two amounts: a percentage (e.g., ten percent) of the minimum agent count, meaning that so few agents have never been seen in the prior data; and/or two times more agent drops than the absolute agent count drop given by the maximum relative agent count drop, meaning that such large relative agent count drop has never been seen in the prior data.

In various implementations, if it is known that the network components may not be used at all at specific times (e.g., a wireless gateway in an office at night), a minimum agent count and a maximum relative agent count drop may be obtained for each hour of the day and for each day of the week. Then, the same procedure as in the previous item may be utilized, except if the minimum agent count is zero. In such a case, drop detection manager 402 may abstain from detecting a usage drop because this may mean that it is possible that the component at this time may not be used rather than being faulty.

The matching of prior data to hour of the day and/or day of the week can be parametrized. For example, there can be a one-to-one match with the hour of the day and the day of the week of the prior data, or matches can be specified to any prior data on groups of days like Tue/Wed/Thu, Mon/Fri, and Sat/Sun. In addition, exclusion for holidays and other calendar events may be specified where no use of the network component is expected.

When executed, pseudo-measurement generation manager 404 may generate pseudo-measurements (e.g., pseudo-measurement 406) that can then be used as an input by existing root cause analysis techniques (e.g., RCA technique 408). For example, once a usage drop is detected (e.g., by drop detection manager 402) in one or more network components in a given round, pseudo-measurement generation manager 404 may generate the pseudo-measurement 406 that will allow the RCA technique 408 to gain visibility into the faulty network component.

For instance, for each network component with a detected usage drop, pseudo-measurement generation manager 404 may be executable to collect all measurements of the N rounds before the usage drop was detected (e.g., where N is a parameter) that have the usage drop network component. Measurements whose periodicity does not match the usage drop round (i.e., measurements that would not appear in the usage drop round due to test frequency) may be optionally filtered by pseudo-measurement generation manager 404. Additionally, the measurements for the round when the usage drop was detected may be collected.

Then, for both the measurements before and at the usage drop round, the pseudo-measurement generation manager 404 may be executable to obtain the component set for each measurement, remove the agent component as the usage drop for an endpoint agent can only get contributions from the endpoint agent itself, and/or obtain a list of unique component sets for these measurements. The pseudo-measurement generation manager 404 may be executable to compare both lists of components sets (e.g., before and at usage drop round) and identify the component sets that were seen before the usage drop round and were not seen in the usage drop round. Each component set may then be tagged with the number of measurements that has this component set.

For each item on the list of unique component sets, the pseudo-measurement generation manager 404 may be executable to adjust the component set by removing components that are upstream from the usage drop component as upstream components could not have caused the usage drop component to fail. Then, the pseudo-measurement generation manager 404 may generate a pseudo-measurement 406 with the adjusted component set and with a virtual measurement count from the measurement count tag.

The pseudo-measurement 406 may be integrated (e.g., as measurement inputs) into the workflow of the RCA technique 408. The pseudo-measurement 406 generated by this process can be utilized by any of a variety of RCA techniques. These techniques may include statistical correlations methods, machine learning models, and heuristic algorithms, all of which can incorporate the pseudo-measurement 406 as indicators of potential faults.

For instance, in statistical correlation methods, pseudo-measurement 406 may act as a placeholder for missing data points, enabling these methods to maintain continuous data sets and perform accurate correlations between network components and observed anomalies. In machine learning models, a pseudo-measurement 406 can be fed into models that predict faults based on historical and current data, allowing the models to consider scenarios where data is missing due to component failures. Heuristic algorithms can use pseudo-measurement 406 to trace back and identify potential fault sources by recognizing patterns in both present and absent data. For example, if a VPN server failure causes a drop in measurements, the pseudo-measurement 406 would indicate the missing data points to the RCA technique 408, enabling the RCA technique 408 to accurately flag the VPN server as the potential cause of a network fault.

FIG. 5 illustrates an example of a simplified procedure for maintaining root cause analysis visibility via pseudo-measurements, in accordance with one or more implementations described herein. For example, a non-generic, specifically configured device (e.g., device 200), may perform procedure 500 (e.g., a method) by executing stored instructions (e.g., pseudo-measurement process 248).

The procedure 500 may start at step 505, and continues to step 510, where, as described in greater detail above, the device (e.g., a controller, processor, etc.) may detect a drop in an amount of agents reporting network measurements for a network component. This may include monitoring historical data to establish a baseline of normal agent activity and/or detecting the drop based on a comparison of the amount of agents reporting network measurements for the network component to the baseline. Here, the baseline may be determined using a minimum agent count threshold and a maximum relative agent count drop threshold derived from the historical data.

At step 515, as detailed above, the device may identify, based on network measurements from before and at a time of the drop, a network component set associated with the drop. This may include obtaining network measurements from before and at the drop and/or determining a network component set associated with each network measurement from before the drop and a network component set associated with each network measurement at the drop. The network component set associated with the drop may be a set of network components associated with a network measurement from before the drop that are not present in a set of network components associated with any of the network measurements at the drop.

At step 520, the device may generate, based on the network component set, a pseudo-measurement to represent absent data associated with the drop. The pseudo-measurement may be adjusted to exclude upstream network components that could not have been the cause of the absent data. In various implementations, the network component set may be tagged with a measurement amount tag indicating an amount of measurements that has this component set. The pseudo-measurement may include a virtual measurement count from the measurement amount tag.

At step 525, the device may provide the pseudo-measurement as an input for root cause analysis. The pseudo-measurement may include an indication of the network component set that is a cause of the absent data. The pseudo-measurement may be an artificial measurement without end-to-end metrics.

Procedure 500 may then end at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, enhance root cause analysis (RCA) in network performance monitoring by addressing the challenge of missing data due to component failures. By detecting drops in the number of agents reporting measurements and generating pseudo-measurements to represent the absent data, these techniques ensure that RCA systems maintain visibility and diagnostic accuracy. The inclusion of metadata about the component set in the pseudo-measurements provides context leverageable by RCA techniques to accurately identify and diagnose faults even in the absence of direct measurement data. This leads to more reliable and continuous network performance analysis, ultimately improving fault detection and resolution efficiency.

While there have been shown and described illustrative implementations that provide for maintaining root cause analysis visibility via pseudo-measurements, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

detecting, by a device, a drop in an amount of agents reporting network measurements for a network component;

identifying, by the device and based on network measurements from before and at a time of the drop, a network component set associated with the drop;

generating, by the device and based on the network component set, a pseudo-measurement to represent absent data associated with the drop; and providing, by the device, the pseudo-measurement as an input for root cause analysis.

2. The method as in claim 1, wherein detecting the drop includes:

monitoring historical data to establish a baseline of normal agent activity; and comparing the amount of agents reporting network measurements for the network component to the baseline.

3. The method as in claim 2, wherein the baseline is determined using a minimum agent count threshold and a maximum relative agent count drop threshold derived from the historical data.

4. The method as in claim 1, wherein the pseudo-measurement includes an indication of the network component set that is a cause of the absent data.

5. The method as in claim 4, wherein the pseudo-measurement is adjusted to exclude upstream network components that could not have been the cause of the absent data.

6. The method as in claim 1, wherein identifying the network component set associated with the drop includes:

obtaining network measurements from before and at the drop; and determining a network component set associated with each network measurement from before the drop and a network component set associated with each network measurement at the drop.

7. The method as in claim 6, wherein the network component set associated with the drop is a set of network components associated with a network measurement from before the drop that are not present in a set of network components associated with any of the network measurements at the drop.

8. The method as in claim 1, further comprising:

tagging the network component set with a measurement amount tag indicating an amount of measurements that has this component set.

9. The method as in claim 8, wherein the pseudo-measurement includes a virtual measurement count from the measurement amount tag.

10. The method as in claim 1, wherein the pseudo-measurement is an artificial measurement without end-to-end metrics.

11. An apparatus, comprising:

one or more network interfaces;

a processor coupled to the one or more network interfaces and configured to execute one or more processes; and a memory configured to store a process that is executable by the processor, the process when executed configured to:

detect a drop in an amount of agents reporting network measurements for a network component;

identify, based on network measurements from before and at a time of the drop, a network component set associated with the drop;

generate, based on the network component set, a pseudo-measurement to represent absent data associated with the drop; and provide the pseudo-measurement as an input for root cause analysis.

12. The apparatus as in claim 11, wherein the process is further configured to:

monitor historical data to establish a baseline of normal agent activity; and detect the drop based on a comparison of the amount of agents reporting network measurements for the network component to the baseline.

13. The apparatus as in claim 12, wherein the baseline is determined using a minimum agent count threshold and a maximum relative agent count drop threshold derived from the historical data.

14. The apparatus as in claim 11, wherein the pseudo-measurement includes an indication of the network component set that is a cause of the absent data.

15. The apparatus as in claim 14, wherein the pseudo-measurement is adjusted to exclude upstream network components that could not have been the cause of the absent data.

16. The apparatus as in claim 11, wherein the process is further configured to:

obtain network measurements from before and at the drop; and determine a network component set associated with each network measurement from before the drop and a network component set associated with each network measurement at the drop.

17. The apparatus as in claim 16, wherein the network component set associated with the drop is a set of network components associated with a network measurement from before the drop that are not present in a set of network components associated with any of the network measurements at the drop.

18. The apparatus as in claim 11, wherein the process is further configured to:

tag the network component set with a measurement amount tag indicating an amount of measurements that has this component set and wherein the pseudo-measurement includes a virtual measurement count from the measurement amount tag.

19. The apparatus as in claim 11, wherein the pseudo-measurement is an artificial measurement without end-to-end metrics.

20. A tangible, non-transitory, computer-readable medium storing program instructions that cause a device to execute a process comprising:

detecting a drop in an amount of agents reporting network measurements for a network component;

identifying, based on network measurements from before and at a time of the drop, a network component set associated with the drop;

generating, based on the network component set, a pseudo-measurement to represent absent data associated with the drop; and providing the pseudo-measurement as an input for root cause analysis.

* * * * *